US010648118B2

(12) United States Patent
An et al.

(10) Patent No.: US 10,648,118 B2
(45) Date of Patent: May 12, 2020

(54) LAUNDRY TREATING APPARATUS

(71) Applicant: LG ELECTRONICS INC., Seoul (KR)

(72) Inventors: Kiyong An, Seoul (KR); Minho Park, Seoul (KR); Kihoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 15/643,881

(22) Filed: Jul. 7, 2017

(65) Prior Publication Data

US 2018/0010283 A1 Jan. 11, 2018

(30) Foreign Application Priority Data

Jul. 7, 2016 (KR) .................. 10-2016-0086343
Oct. 26, 2016 (KR) .................. 10-2016-0140290
Jun. 2, 2017 (KR) .................. 10-2017-0069025

(51) Int. Cl.
| | | |
|---|---|---|
| *D06F 37/22* | (2006.01) | |
| *D06F 39/12* | (2006.01) | |
| *D06F 37/24* | (2006.01) | |
| *F16F 7/08* | (2006.01) | |
| *F16F 7/108* | (2006.01) | |
| *F16F 15/02* | (2006.01) | |

(52) U.S. Cl.
CPC ............ *D06F 37/225* (2013.01); *D06F 37/22* (2013.01); *F16F 7/08* (2013.01); *F16F 7/108* (2013.01); *F16F 15/02* (2013.01); *D06F 37/24* (2013.01); *D06F 37/245* (2013.01); *D06F 39/12* (2013.01)

(58) Field of Classification Search
CPC .......... D06F 37/20; D06F 37/22; D06F 37/24; D06F 37/225; D06F 37/245
See application file for complete search history.

(56) References Cited

U.S. PATENT DOCUMENTS

| | | | |
|---|---|---|---|
| 5,775,472 | A | 7/1998 | Osterberg et al. |
| 5,855,353 | A | 1/1999 | Shaffer et al. |
| 5,924,312 | A | 7/1999 | Vande Haar |
| 5,946,947 | A | 9/1999 | Lee et al. |
| 8,443,636 | B2 | 5/2013 | Galassi et al. |
| 2004/0173426 | A1 | 9/2004 | Athanasiou |

(Continued)

FOREIGN PATENT DOCUMENTS

| | | |
|---|---|---|
| CN | 1165884 | 11/1997 |
| CN | 101314906 | 12/2008 |

(Continued)

OTHER PUBLICATIONS

United States Office Action dated February 25, 2019 issued in co-pending related U.S. Appl. No. 15/643,545.

(Continued)

*Primary Examiner* — Joseph L. Perrin
(74) *Attorney, Agent, or Firm* — Ked & Associates, LLP

(57) ABSTRACT

A laundry treating apparatus is provided. The laundry treating apparatus includes a cabinet, a drum accommodated in the cabinet, a tub accommodating the drum, and a dynamic absorber provided to absorb oscillation of the cabinet. The dynamic absorber includes a support plate coupled to the cabinet, a moving mass provided on the support plate, and a slider interposed between the moving mass and the support plate to apply a frictional force to attenuate a reciprocating motion of the moving mass.

20 Claims, 14 Drawing Sheets

(56) References Cited

U.S. PATENT DOCUMENTS

| | | |
|---|---|---|
| 2004/0263032 A1 | 12/2004 | Cho |
| 2006/0117812 A1 | 6/2006 | Wee |
| 2008/0178634 A1 | 7/2008 | Kim et al. |
| 2008/0295545 A1 | 12/2008 | Kim et al. |
| 2009/0151398 A1 | 6/2009 | Fang et al. |
| 2010/0024491 A1 | 2/2010 | Galassi et al. |
| 2013/0043101 A1 | 2/2013 | Takahashi et al. |
| 2013/0118211 A1 | 5/2013 | Chang et al. |

FOREIGN PATENT DOCUMENTS

| | | |
|---|---|---|
| CN | 101529006 | 9/2009 |
| CN | 102883921 | 1/2013 |
| CN | 103103718 | 5/2013 |
| JP | 2001-254775 | 9/2001 |
| JP | 2003-176641 | 6/2003 |
| JP | 2010-194023 | 9/2010 |
| JP | 2010-194024 | 9/2010 |
| JP | 2015-154879 | 8/2015 |
| JP | 2015-154880 | 8/2015 |
| KR | 10-0782988 | 12/2007 |
| KR | 10-0798780 | 1/2008 |
| KR | 10-2012-0106245 | 9/2012 |
| KR | 10-2013-0052071 | 5/2013 |

OTHER PUBLICATIONS

Machine Translation of JP 2010-194023A to Panasonic (Year: 2009).
U.S. Office Action dated May 6, 2019 issued in U.S. Appl. No. 15/643,662.
PCT International Search Report (with English Translation) dated Sep. 19, 2017 issued in Application No. PCT/KR2017/006044.
European Search Report dated Oct. 13, 2017 issued in Application No. 17179986.9.
Chinese Office Action dated Apr. 30, 2019 issued in CN Application No. 201710546280.X.
Chinese Office Action dated Jul. 17, 2019 issued in Application No. 201710546291.8 (with English Translation).
Chinese Office Action dated May 28, 2019 issued in CN Application No. 201710546898.6.
Japanese Office Action dated Mar. 24, 2020 issued in JP Application No. 2019-500394.

LAUNDRY TREATING APPARATUS

CROSS-REFERENCE TO RELATED APPLICATION(S)

The present application claims priority under 35 U.S.C. 119 and 35 U.S.C. 365 to Korean Patent Application Nos. 10-2016-0086343 (filed on Jul. 7, 2016), 10-2016-0140290 (filed on Oct. 26, 2016), and 10-2017-0069025 (filed on Jun. 2, 2017), which are hereby incorporated by reference in their entireties.

BACKGROUND

1. Field

The present disclosure relates to a laundry treating apparatus.

2. Background

In the case of home appliance provided with a rotating drum such as a washing machine or a dryer, as the rotational speed (rpm) of the drum increases, horizontal excitation force is generated by eccentricity of laundry put into the drum, i.e., a load. Particularly, in the dehydration process, transient oscillation (damped oscillation (vibration)) in which horizontal oscillation displacement of a cabinet of the washing machine rapidly increases at a resonant frequency point of the cabinet of the washing machine occurs while the rotational speed of the drum increases. Also, when the drum is constantly maintained at the maximum speed, continuous oscillation (steady-state oscillation (vibration)) in which the same oscillation is constantly repeated occurs.

The transient oscillation causes a phenomenon in which the washing machine is wobbled in a lateral direction while the rotational speed of the drum increases. Also, the transient oscillation is more pronounced in a stack type washing machine in which the washing machine is spaced apart from the ground. For example, in the case of a compact washing machine or the stack type washing machine that is stacked on a top surface of an object for storing laundry, the oscillation displacement of the transient oscillation is larger than that of a general washing machine that is placed directly on an installation surface, and the transient oscillation occurs at a low speed operation. That is, a time point at which the transient oscillation occurs is accelerated in the stack type washing machine when compared to a washing machine that is placed directly on the floor.

To absorb the transient oscillation, a dynamic absorber is generally installed in the washing machine. The dynamic absorber may be a dynamic absorber using a principle of absorbing the oscillation of the washing machine by oscillating in a horizontal direction in a phase opposite to that of the horizontal excitation force generated by the rotation of the drum by about 180 degrees.

In detail, when the rotation of the drum is accelerated, the horizontal excitation force is generated by rotation of the eccentric load (laundry) as described above. Also, when the number of revolutions of the drum increases to reach the resonant frequency of the drum, the cabinet of the washing machine harmonically oscillates at a resonant point in a phase difference of about 90 degrees with respect to the excitation force.

Also, the dynamic absorber harmonically oscillates at the resonant point in a phase difference of about 90 degrees with respect to the oscillation of the cabinet of the washing machine. As a result, the excitation force and the dynamic absorber oscillate in a phase difference of about 180 degrees therebetween in opposite directions to offset the oscillation, thereby the cabinet of the washing machine from moving.

A dynamic absorber for a washing machine is disclosed in US Patent Registration No. 8443636 (issued May 21, 2013). That dynamic absorber has a structure in which a frame is provided on a bottom surface of a casing of a washing machine, a viscoelastic member is provided on a top surface of the frame, and a moving mass for absorbing oscillation is provided on a top surface of the viscoelastic member.

The disclosed dynamic absorber has limitations as follows. First, since the viscoelastic member is provided on a bottom surface of the moving mass, a load of the moving mass may continuously act on the viscoelastic member to cause damage and performance deterioration of the viscoelastic member. Second, when the moving mass oscillates horizontally, since the viscoelastic member absorbs the oscillation by using shear stress acting in the lateral direction, there is a limitation that transient oscillation is not effectively absorbed due to a low damping ratio. Although the feature in which the oscillation is effectively absorbed in the entire range of the number of revolutions of the drum is disclosed, the disclosed dynamic absorber may have an effect of absorbing continuous oscillation, but the capability to absorb transient oscillation with suddenly increasing oscillation displacement may be significantly reduced.

Third, since the share stress alternately acts on the viscoelastic member, there is a disadvantage that possibility of damage of the viscoelastic member increases, and the lifespan of the viscoelastic member is shortened. Fourth, when the horizontal oscillation is applied to the washing machine, and thus, the moving mass moves horizontally in a direction opposite to the oscillation, and viscoelastic member is bent while an upper end of the viscoelastic member moves in the lateral direction. As a result, there is a limitation that the moving mass is not shaken in the lateral direction while maintaining the horizontal state so as to absorb the oscillation. That is to say, when the moving mass is shaken in the lateral direction to absorb transverse oscillation, left and right ends of the moving mass are tilted downward due to the bending of the viscoelastic member. As a result, the horizontal oscillation acting on the washing machine may not be effectively absorbed.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Hereinafter, a laundry treating apparatus according to an embodiment will be described in detail with reference to the accompanying drawings.

First, the terms described below will be defined. The transient (damped) oscillation (vibration), which will be described below, is defined as oscillation in which, when a drum into which laundry is put rotates to be accelerated for rinse or dehydration, oscillation displacement of a cabinet rapidly increases at a resonant point of the drum. Also, continuous (steady-state) oscillation (vibration), which will be described below, is defined as oscillation that is continuously generated with almost constant oscillation displacement while the drum is maintained at the maximum speed. Also, the improvement or the absorption of the transient oscillation or the continuous oscillation by the dynamic absorber (or dampener) according to an embodiment may be understood as a phenomenon in which the dynamic absorber removes or minimizes the transient oscillation or the continuous oscillation to dampen or minimize the oscillation of the cabinet.

Figure 1:
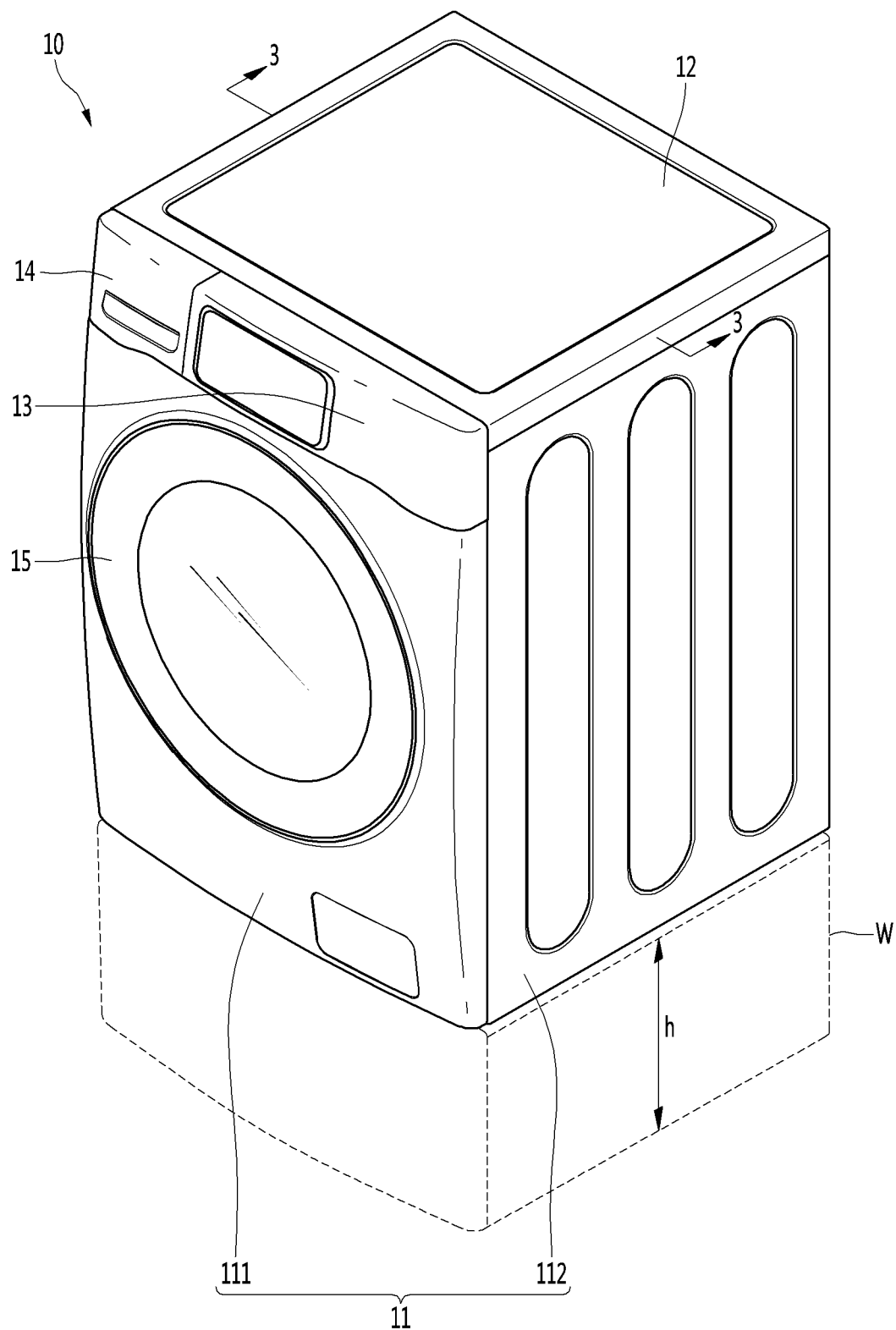
FIG. 1 is a perspective view illustrating a laundry treating apparatus according to an embodiment.
Figure 2:
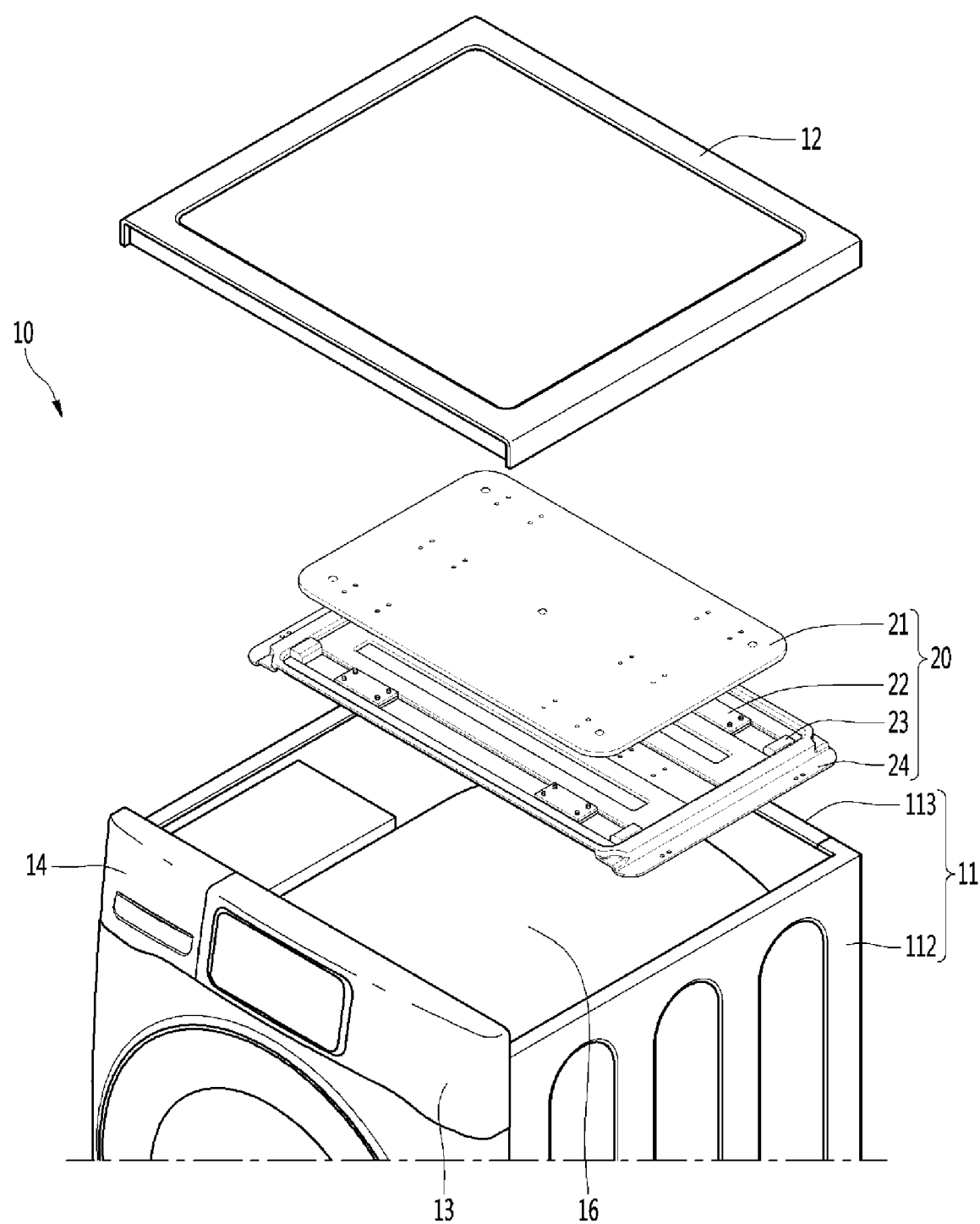
FIG. 2 is an exploded perspective view illustrating an inner structure of the laundry treating apparatus including a dynamic absorber according to an embodiment.
Figure 3:
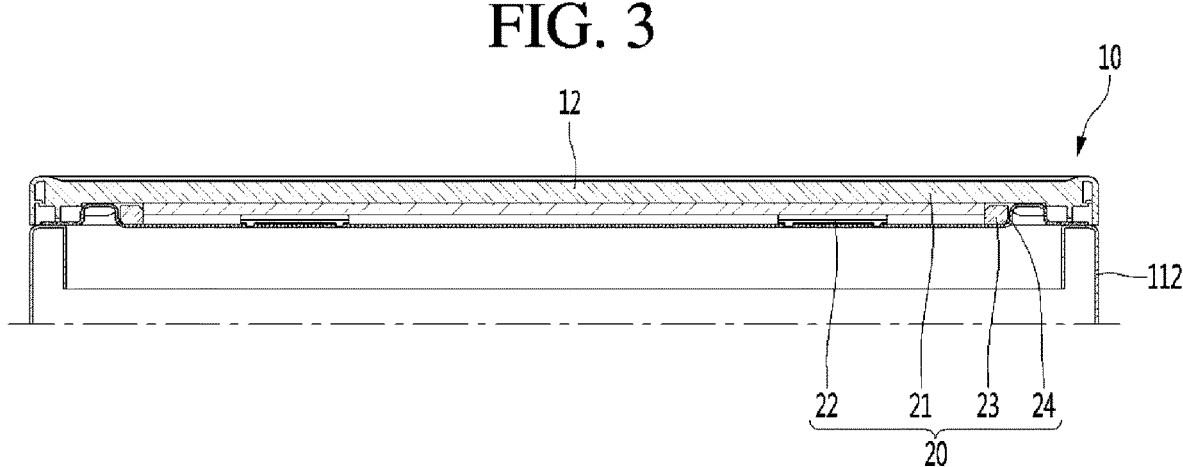
FIG. 3 is a partial longitudinal cross-sectional view taken along line 303 of FIG. 1.

FIG. 1 is a perspective view illustrating a laundry treating apparatus according to an embodiment, FIG. 2 is an exploded perspective view illustrating an inner structure of the laundry treating apparatus including a dynamic absorber according to an embodiment, and FIG. 3 is a partial longitudinal cross-sectional view taken along line 303 of FIG. 1. Referring to FIGS. 1 to 3, a laundry treating apparatus 10 according to an embodiment may include a cabinet 11, a dynamic absorber 20 provided on a top surface of the cabinet 11 to absorb oscillation transmitted to the cabinet 11, a drum (not shown) accommodated in the cabinet 11, and a tub 16 accommodating the drum.

In detail, the cabinet 11 includes a front cabinet 111, side cabinets 112, and a rear cabinet 113. A top plate 12 is placed on a top surface of the cabinet 11 to cover an upper opening of the cabinet 11. Also, a door 15 is rotatably coupled to the front cabinet 111 so that laundry is put into the drum. Also, a detergent box 14 and a control panel 13 may be provided on an upper end of the front cabinet 111. Also, the laundry treating apparatus 10 may be provided directly on an installation surface or provided on a separate stacking body W having a predetermined height h. The separate stacking body W may be an independent washing machine having a small volume or a storage box for storing objects including the laundry, but is not limited thereto.

In detail, the dynamic absorber 20 may include a support plate (or support) 24 seated on the cabinet 11, a moving mass (or mass body) 21 provided to be horizontally movable on a top surface of the support plate 24, a slider interposed between a bottom surface of the moving mass 21 and a top surface of the support plate 24 and movable in a lateral direction of the moving mass 21, and an elastic damper 23 interposed between a side surface of the moving mass 21 and the support plate 24.

Here, the moving mass 21 may be defined as a mass that moves in a phase opposite to horizontal excitation force generated by the rotation of the drum having an eccentric load to absorb oscillation of the cabinet 11.

Also, left and right ends of the support plate (or support) 24 are seated on upper ends of the left and right side cabinets 112, respectively. Also, since the detergent box 14 and the control panel 13 are provided in an inner upper portion of the cabinet 11, the dynamic absorber 20 may be provided to be spaced backward from a front end of the cabinet 11 so that the dynamic absorber 20 does not interfere with the detergent box 14 and the control panel 13. For example, a horizontal distance between a front end of the support plate 24 and the front cabinet 111 may be set to be greater than that between a rear end of the support plate 24 and the rear cabinet 113. However, an embodiment of the present disclosure is not limited thereto. For example, the dynamic absorber 20 may be provided at a center of the top surface of the cabinet 11.

Figure 4:
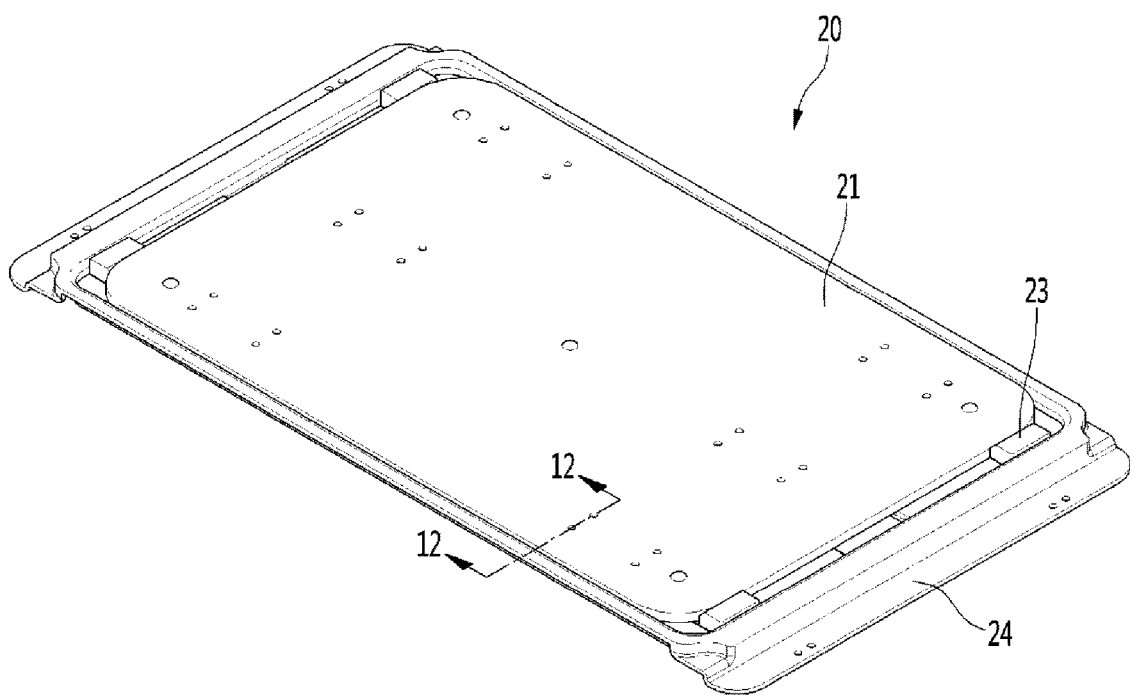
FIG. 4 is a perspective view of the dynamic absorber according to an embodiment.
Figure 5:
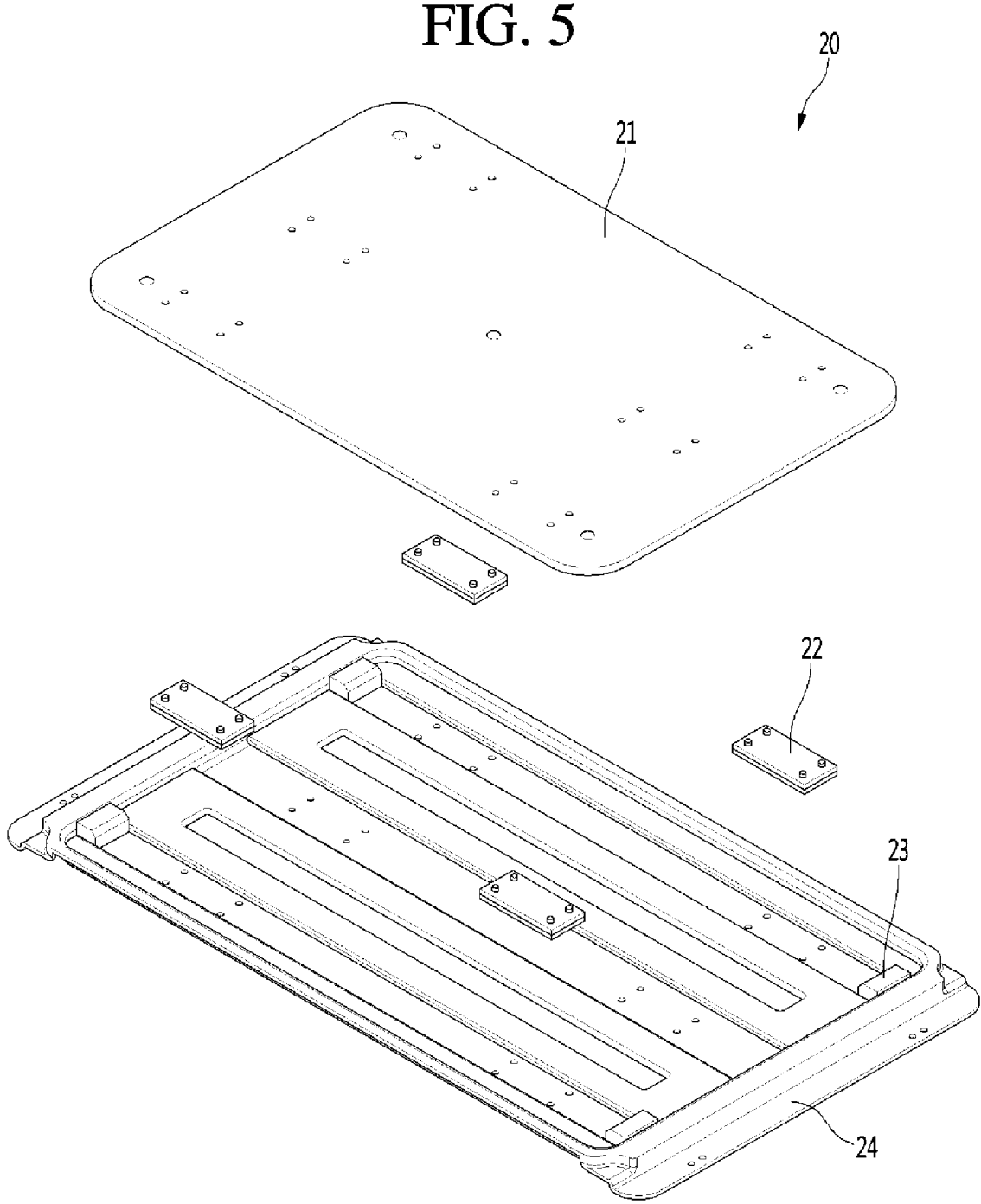
FIG. 5 is an exploded perspective view of the dynamic absorber.

Hereinafter, a structure and function of the dynamic absorber 20 will be described in detail with reference to the accompanying drawings. FIG. 4 is a perspective view of the dynamic absorber according to an embodiment, and FIG. 5 is an exploded perspective view of the dynamic absorber. Referring to FIGS. 4 and 5, the dynamic absorber 20 according to an embodiment may include the moving mass 21, the slider (or slider body) 22, the elastic damper 23, and the support plate 24, as described above. However, in some cases, it is noted that it is understood that the dynamic absorber 20 represents the moving mass 21.

In detail, one portion of the slider 22 is coupled to a bottom surface of the moving mass 21, and the other portion is fixed to a top surface of the support plate 24. In another example, the slider may be integrated with the moving mass 21 or the support plate 24. Also, the moving mass 21 slidably moves in a direction (phase) opposite to excitation force transmitted to the cabinet 11 on the support plate 24 to absorb the oscillation transmitted to the cabinet 11. In detail, when horizontal oscillation is generated by the excitation force as the drum rotates to be accelerated, the moving mass 21 collides with the elastic damper 23 while moving in the phase opposite to that of the excitation force, and thus, the elastic damper 23 absorbs an impact applied to the moving mass 21 through elastic deformation thereof.

Here, predetermined frictional force acts on the slider 22, and the frictional force acts as attenuation of the dynamic absorber 20. Also, the attenuation of the dynamic absorber 20 may act as a variable for determining the oscillation displacement of the transient oscillation. Also, a frictional coefficient of the frictional force determines the magnitude of the attenuation. The more the attenuation (or an attenuation value) increases, the more the transient oscillation absorption capacity of the dynamic absorber 20 is improved.

Of course, since the elastic damper 23 has the attenuation function for absorbing the transient oscillation as well as the elastic (or rigidity), although it affects the improvement of the transient oscillation, it is significantly smaller than the attenuation due to the friction. Thus, the elastic damper 23 may be a damper that mainly affects the continuous oscillation transmitted to the cabinet 11 by the dynamic absorber 20.

Figure 6:
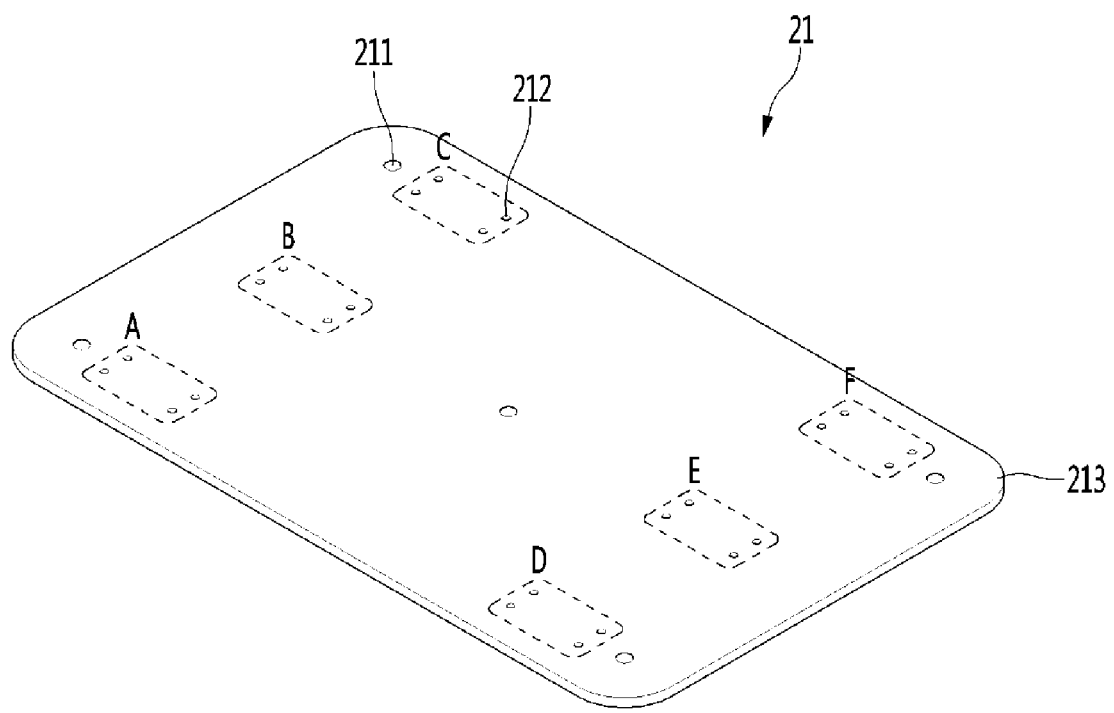
FIG. 6 is a perspective view of a moving mass constituting the dynamic absorber according to an embodiment.

FIG. 6 is a perspective view of the moving mass constituting the dynamic absorber according to an embodiment. Referring to FIG. 6, the moving mass 21 according to an embodiment may be provided as a rectangular plate made of a metal material including iron, but is not limited thereto. For example, the moving mass 21 may be made of other materials in addition to the iron. In detail, the moving mass 21 may be manufactured by laminating a plurality of metal plates having a thin thickness. Here, the laminated metal plates may be fixed by using a rivet part 211 to form a single body. Also, 5 to 10 sheets of metal plates may be laminated, particularly, 8 sheets of metal plates may be laminated, but is not limited thereto. For another example, the moving mass 21 may be a single metal plate having a predetermined thickness. Also, the moving mass 21 may have a mass of about 4 kg to about 10 kg, particularly, about 6 kg to about 8 kg, more particularly, about 7 kg.

Also, at least one corner 213 of the moving mass 21 may be rounded at a predetermined curvature, but is not limited thereto. Also, the rivet part 211 may be provided at a central portion of each of four corners of the moving mass 21. A plurality of slider coupling holes 212 are defined in the moving mass 21, and the slider 22 is coupled to each of the slider coupling holes 212. In detail, the number of slider coupling holes 212 corresponding to the number of coupling protrusions provided on the slider 22 may be provided to form one group. Also, a plurality of slider coupling hole groups may be defined in the moving mass 21 so that a coupling position of the slider 22 is adequately set.

For example, three or four sliders 22 may be mounted on the bottom surface of the moving mass 21. That is, the moving mass 21 may be supported at three points or four points by the sliders 22. To satisfy this condition, the plurality of slider coupling hole groups A to F may be defined to be spaced a predetermined distance from each other in the moving mass 21. If the moving mass 21 is designed to be supported at the three points, the groups A, E, and C or groups B, D, and F of the plurality of coupling hole groups may be selected, and then, the sliders 22 may be mounted on the groups. Alternatively, if the moving mass 21 is designed to be supported at the four points, the groups A, D, F, and C may be selected, and then, the sliders 22 may be mounted on the groups.

As described above, since the plurality of coupling hole groups for coupling the sliders 22 to the moving mass 21 are provided, a degree of freedom for mounting the sliders may increase. Hereinafter, a structure in which four sliders 22 are mounted at four points of the moving mass 21 will be described as an example. That is, a structure in which four sliders 22 are provided on the groups A, D, F, and C will be described as an example.

Figure 7:
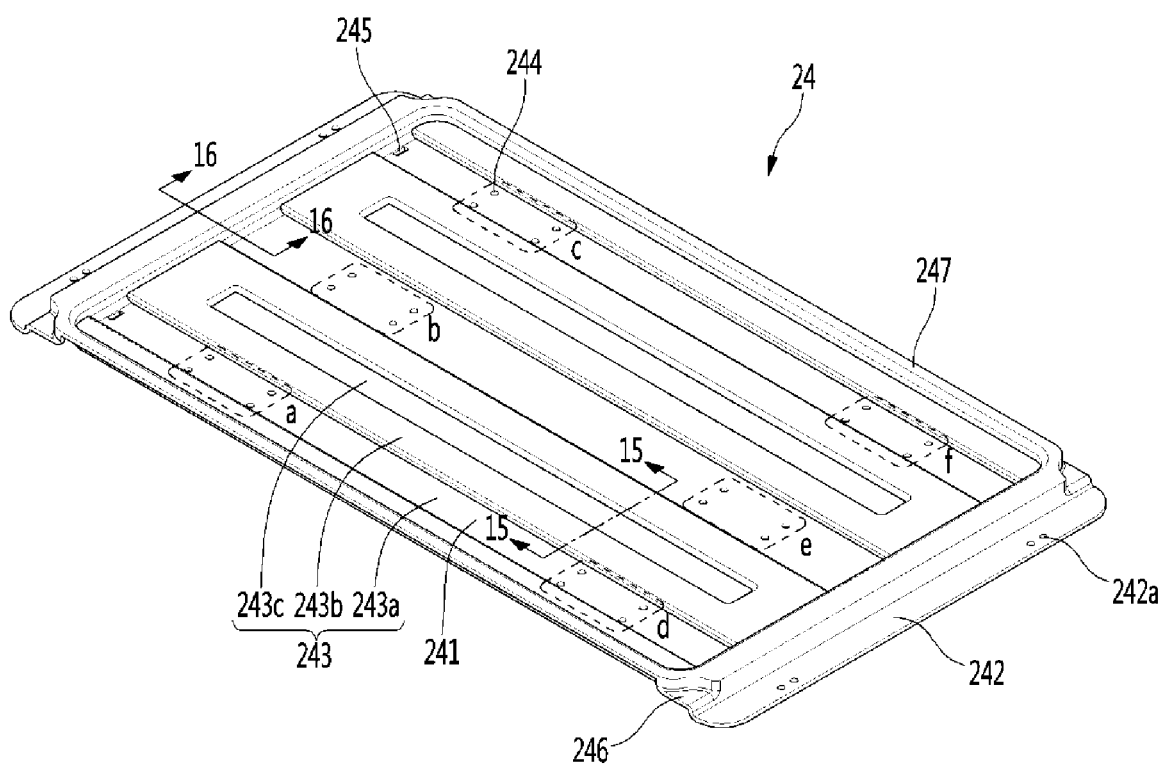
FIG. 7 is a perspective view of a support plate constituting the dynamic absorber according to an embodiment.

FIG. 7 is a perspective view of a support plate constituting the dynamic absorber according to an embodiment. Referring to FIG. 7, the support plate 24 constituting the dynamic absorber 20 according to an embodiment may be a rectangular metal plate. Also, the support plate 24 may have a mass of approximately 1.5 kg.

In detail, the support plate 24 may include a cabinet seating part (or cabinet seating extension or cabinet coupling extensions) 242 seated on an upper end of the cabinet 11, a projection 247 protruding upward from a position spaced a predetermined distance from the cabinet seating part 242, and a moving mass seating part (or moving mass accommodation groove or mass body accommodation groove) 241 recessed by a predetermined depth downward from the inside of the projection 247. The cabinet seating part 242 may be defined as a cabinet coupling part. Also, the cabinet seating part 242 may include a left cabinet seating part (or a left cabinet coupling part) and a right cabinet seating part (or a right cabinet coupling part). Here, one of the left and right cabinet coupling parts may be called a first cabinet coupling part, and the other may be called a second cabinet coupling part.

Also, the moving mass seating part 241 has a lateral width greater than a length of the moving mass 21 so that the moving mass 21 moves in a lateral direction in a state of being seated on the moving mass seating part 241. The moving mass seating part 241 may be recessed by a predetermined depth at which the moving mass 21 does not come into contact with a bottom surface of the top plate 12 in the state in which the moving mass 21 is seated on the moving mass seating part 241.

Also, one or a plurality of coupling holes 242a may be defined in the cabinet seating part 242. A coupling member such as a screw may pass through each of the coupling holes 242a and be coupled to an upper end of the cabinet 11. As illustrated in FIG. 3, the cabinet 11, particularly, the top surface of the side cabinet 112 may have a flat surface that is bent in a central direction of the cabinet 11, and the cabinet seating part 242 is seated on the flat surface. Also, the coupling member may successively pass through the cabinet seating part 242 and the flat surface.

Also, although the coupling hole 242a may be defined in each of points of front and rear ends of the cabinet seating part 242, an embodiment of the present disclosure is not limited thereto. For example, the coupling hole 242a may be defined in each of points of a front end, a center, and a rear end of the cabinet seating part 242.

To reinforce strength of the support plate 24, a forming part (or forming protrusion) 243 may be defined in the bottom of the moving mass seating part 241. In detail, the forming part 243 may include a plurality of first recesses 243a recessed by a predetermined depth from a top surface of the projection 247, a plurality of protrusions 243b alternately provided between the plurality of first recesses 243a, and a second recess 243c defined inside each of the plurality of protrusions 243b. Also, each of the first recesses 243a and the protrusions 243b may extend from a left edge to a right edge of the moving mass seating part 241, and left and right ends of the second recess 243c may be spaced a predetermined distance from the left and right edges of the moving mass seating part 241, respectively.

As described above, since the plurality of recesses and the plurality of protrusions are alternately provided, the strength of the support plate 24 may be reinforced, and thus, natural oscillation of the support plate 24 may increase. When the natural oscillation increases, possible of oscillation of the support plate 24 may be lowered by the oscillation applied to the laundry treating apparatus 10.

Also, a slider coupling hole 244 may be defined in the first recess 243a, and the slider 25 may be provided in the first recess 243a to minimize a mounted height of the moving mass 21. Here, a length of the support plate 24 represents a distance between the left cabinet seating part and the right cabinet seating part, and a width of the support plate 24 represents a distance between the front end and the rear end of the support plate 24. The support plate 24 may support the moving mass 21 and also hold upper ends of the left and right side cabinets 112 to absorb the oscillation transmitted to the cabinet 112.

Like the moving mass 21, a plurality of slider coupling groups a to f may be defined in the moving mass seating part 241. Each of the slider coupling hole groups includes a plurality of slider coupling holes 244. Also, a lower slider (see FIG. 10) is mounted on the slider coupling hole group of the support plate 24, which corresponds to a directly downward side of an upper slider (see FIG. 8).

Also, the moving mass seating part 241 may be stopped or recessed by a depth, which is greater than a thickness of the moving mass 21, from the top surface of the support plate 24. Since the moving mass seating part 241 is stepped or recessed by the depth, which is greater than the thickness of the moving mass 21, when the top plate 12 is coupled to the top surface of the cabinet 11, the moving mass 21 does not interfere with the top plate 12. That is, the top plate 12 may be seated on a top surface of the projection 247 or spaced slightly from the top surface of the projection 247.

If when the moving mass 21 interferes with the top plate 12, a bottom surface of the top plate 12 or the top surface of the moving mass 21 may be worn or damaged while the moving mass 21 is shaken in the lateral direction. In addition, the moving mass 21 may interrupt the shaking in a phase opposite to the oscillation phase of the cabinet 11, and thus, the oscillation of the cabinet may not be well absorbed.

An elastic damper coupling hole 245 for mounting the elastic damper 23 is defined in each of left and right edges of the moving mass seating part 241. The elastic damper coupling hole 245 may be defined in each of left and right edges of the front end and left and right edges of the rear end of the support plate 24.

One elastic damper 23 may be provided at a center of each of the left and right edges of the moving mass 21. Alternatively, as illustrated in the drawings, two elastic dampers 23 may be provided at each of front and rear sides of the side ends of the moving mass 21. Alternatively, the elastic damper having a length corresponding to a front and rear width of the moving mass 21 may be provided at each of left and right edges of the moving mass 21.

Here, since the projection 247 is provided, the elastic damper 23 may be stably supported. In detail, when the moving mass 21 collides with the elastic damper 23, the elastic damper 23 may be elastically deformed and also pushed by impact force of the moving mass 21. Here, the elastic damper 23 may be supported by the projection 247 to prevent the elastic damper 23 from being separated from the support plate 24.

If the projection 247 and the moving mass seating part 241 are not provided, and the support plate 24 is provided in a flat iron plate shape, the elastic damper 23 may be coupled in such a manner in which the elastic damper 23 protrudes from a top surface of each of left and right edges of the support plate 24. Also, the moving mass 21 is provided between the left and right elastic dampers 23. In this structure, when the moving mass 21 moves in the horizontal direction, the elastic damper 23 colliding with the moving mass 21 may be separated from the support plate 24 by the impact force.

Also, a stepped portion 246 may be provided on the corner of the projection 247. A bottom surface of the stepped portion 246 may be higher than the cabinet seating part 242 to increase strength at the edges of the support plate 24. Furthermore, when the top plate 12 is seated on the upper end of the cabinet 11, constituents including a rib that protrudes from the bottom surface of the top plate 12 corresponding to an upper side of the stepped portion 246 may be prevented form interfering with the support plate 24.

Figure 8:
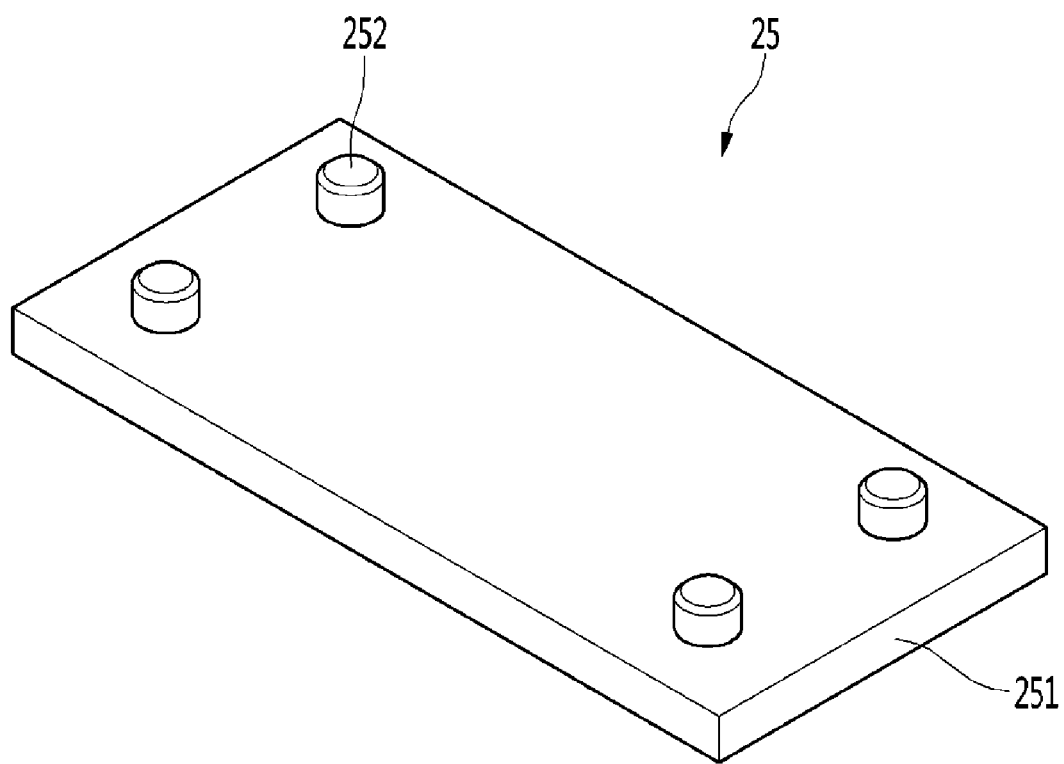
FIG. 8 is a top perspective view of an upper slider constituting a slider according to an embodiment.
Figure 9:
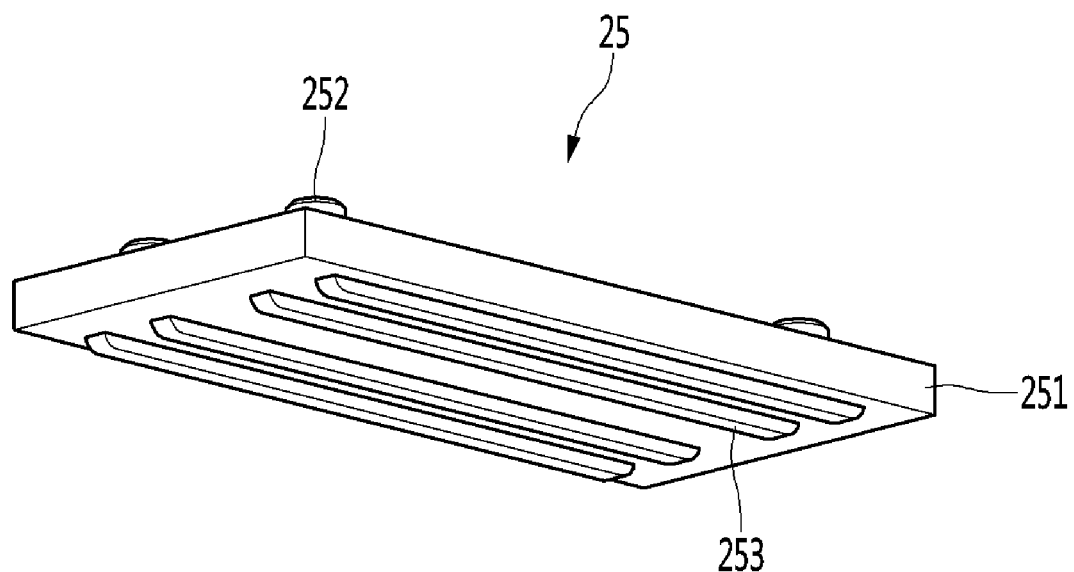
FIG. 9 is a bottom perspective view of the upper slider.

FIG. 8 is a top perspective view of the upper slider constituting the slider according to an embodiment, and FIG. 9 is a bottom perspective view of the upper slider. Referring to FIGS. 8 and 9, the slider 22 according to an embodiment may include an upper slider 25 mounted on the bottom surface of the moving mass 21 and a lower slider 26 mounted on the top surface of the support plate 24. One of the upper slider 25 and the lower slider 26 may be defined as a first slider, and the other may be defined as a second slider.

In detail, the upper slider 25 may include an upper slider body 251 having an approximately rectangular shape, a plurality of coupling protrusions 252 protruding from four corners of a top surface of the upper slider body 251, and a plurality of slider rails 253 protruding from a bottom surface of the upper slider body 251 and extending in a longitudinal direction of the upper slider body 251. In detail, the plurality of coupling protrusions 252 may be inserted into the plurality of slider coupling holes 212 defined in the moving mass 21. The number of the slider coupling holes 212 corresponding to the number of coupling protrusions 252 may be provided in the moving mass 21.

Also, the plurality of slider coupling holes 212 corresponding to the number and position of the coupling protrusions 252 may form one slider coupling hole group. Also, as described above, a plurality of slider coupling hole groups may be defined in the moving mass 21 so that the upper slider 25 is coupled to the bottom surface of the moving mass 21 at various positions.

The coupling protrusions 252 may protrude from the four corners of the top surface of the upper slider body 251, but are not limited thereto. For another example, one coupling protrusion may protrude from a center of one edge of the top surface of the upper slider body 251, and also, the coupling protrusion may protrude from each of two corners of the facing edge in a three point supporting manner. In another example, at least two coupling protrusions may be arranged in a row in a width direction or a longitudinal direction at the center of the top surface of the upper slider body 251.

Also, a pair of two slider rails 253 may be inserted into rail accommodation grooves 262 (that will be described later) defined in the lower slider 26. When the slider rails 253 are accommodated into the rail accommodation grooves 262, the moving mass 21 may be shaken on the support plate 24 in a direction opposite to the lateral oscillation of the cabinet 11. Also, when the slider rails 253 are accommodated into the rail accommodation grooves 262, the moving mass 21 may be prevented from being shaken in the front and rear direction of the cabinet 11. Although the two slider rails 253 are accommodated into the rail accommodation grooves 262, an embodiment of the present disclosure is not limited thereto. For example, it is noted that at least three slider rails 253 may be accommodated into the rail accommodation grooves 262.

Figure 10:
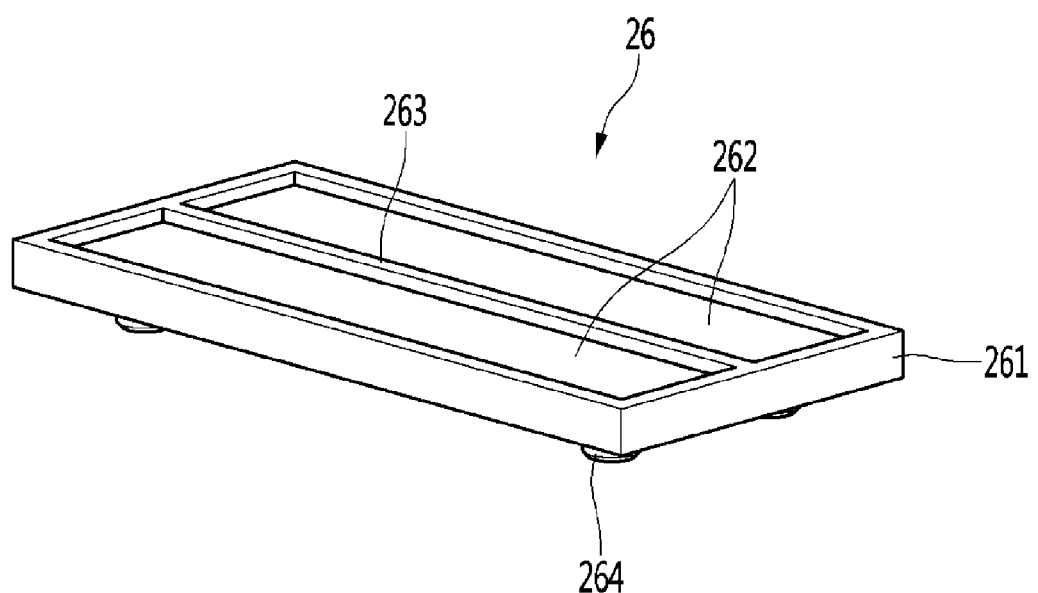
FIG. 10 is a top perspective view of a lower slider constituting a slider according to an embodiment.
Figure 11:
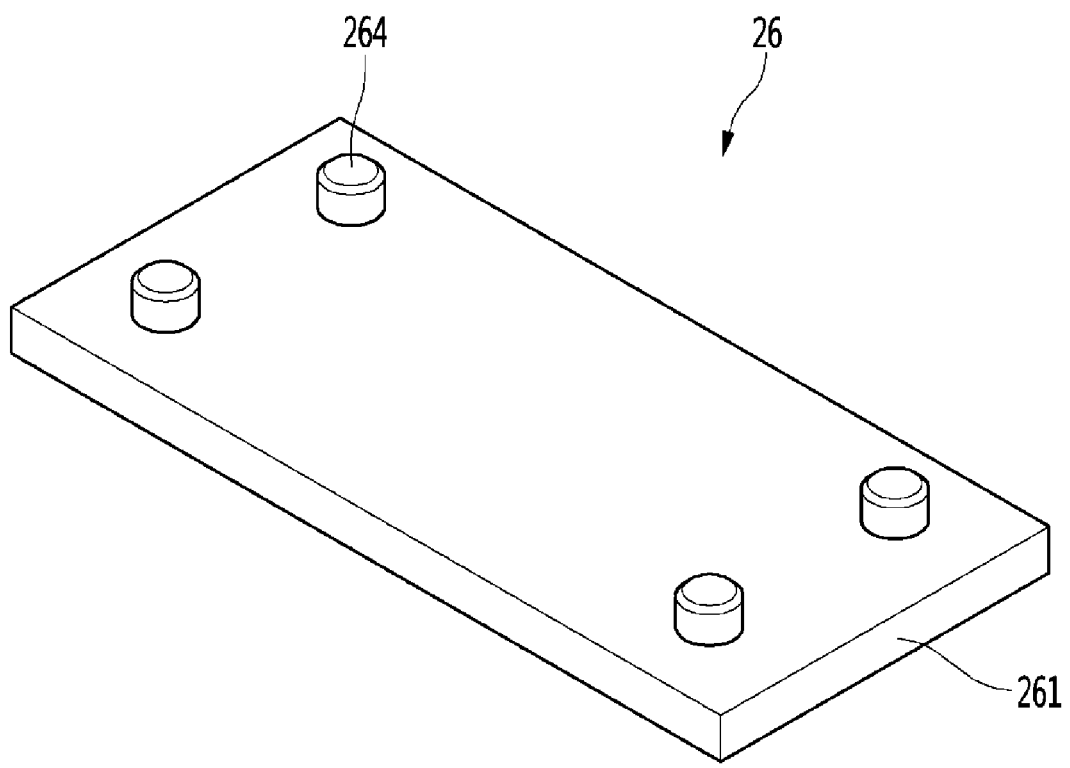
FIG. 11 is a bottom perspective view of the lower slider.

FIG. 10 is a top perspective view of the lower slider constituting a slider according to an embodiment, and FIG. 11 is a bottom perspective view of the lower slider. Referring to FIGS. 10 and 11, the lower slider 26 constituting the slider 22 according to an embodiment may have a rectangular shape having the same size as the upper slider 25.

In detail, the lower slider 26 may include a lower slider body 261 having the same shape as the upper slider body 251, a rail accommodation groove 262 extending from the top surface of the lower slider body 261 in the longitudinal direction of the lower slider body 261, and a plurality of coupling protrusions 264 protruding from a bottom surface of the lower slider body 261.

In more detail, the plurality of coupling protrusions 264 may have the same shape and number as the plurality of coupling protrusions 264 provided on the upper slider 25 on the same formation position. Thus, duplicated description of the plurality of coupling protrusions 264 provided on the lower slider 26 will be omitted. A plurality of slider coupling holes 244 corresponding to the plurality of coupling protrusions 264 may be defined in the support plate 24, and groups of the slider coupling holes may be defined in a plurality of positions.

Also, the plurality of rail accommodation grooves 262 may be arranged in parallel to each other with a width less than that of the slider body 261. The plurality of rail accommodation grooves 262 may be partitioned by a partition wall 263. In this embodiment, although the two rail accommodation grooves 262 are arranged in parallel to each other in the width direction of the slider body 261, an embodiment of the present disclosure is not limited thereto. For example, at least three rail accommodation grooves may be arranged in parallel to each other.

Also, two or more slider rails 253 may be accommodated in each of the rail accommodation grooves 262, and at least two slider rails 253 may come into contact with front and rare edges of the rail accommodation groove 262. That is, the frontmost rail of the at least two slider rails 253 accommodated into the rail accommodation groove 262 may come into contact with the front edge of the rail accommodation groove 262, and the rear rail may come into contact with the rear edge of the rail accommodation groove 262. For example, when three slider rails are provided, two slider rails may come into contact with front and rear surfaces of the rail accommodation groove 262, the rest may be provided at a center of the rail accommodation groove 262.

As described above, since at least two slider rails 253 come into contact with the front and rear edges of the rail accommodation grooves 262, when the moving mass 21 moves in the lateral direction (the longitudinal direction of the slider), the transient oscillation of the cabinet 11 may be absorbed by the frictional attenuation. In addition, it is possible to obtain an effect of preventing the moving mass 21 from being shaken in the front and rear direction (the front and rear width direction of the slider).

Also, the slider rail 253 may laterally move in the state in which the bottom surface of the slider rail 253 comes into contact with the bottom surface of the rail accommodation groove 262 to generate frictional force, and thus, the transient oscillation of the cabinet 11 may be absorbed by the frictional attenuation. Also, the upper slider 25 and the lower slider 26 may be molded by using engineering plastic made of polyoxymethylene (POM). Also, since a noise is generated when the plastic made of the same material moves while coming into contact therewith, a lubricant such as grease may be applied to the rail accommodation groove 262.

The rail accommodation groove 262 has a length greater than that of the slider rail 253 so that the upper slider 25 is reciprocated in the lateral direction on the lower slider 26. This is done because, if the upper slider 25 does not move in the lateral direction on the lower slider 26, the moving mass 21 does not oscillate in a phase opposite to that of the excitation force generated by the drum.

Figure 12:
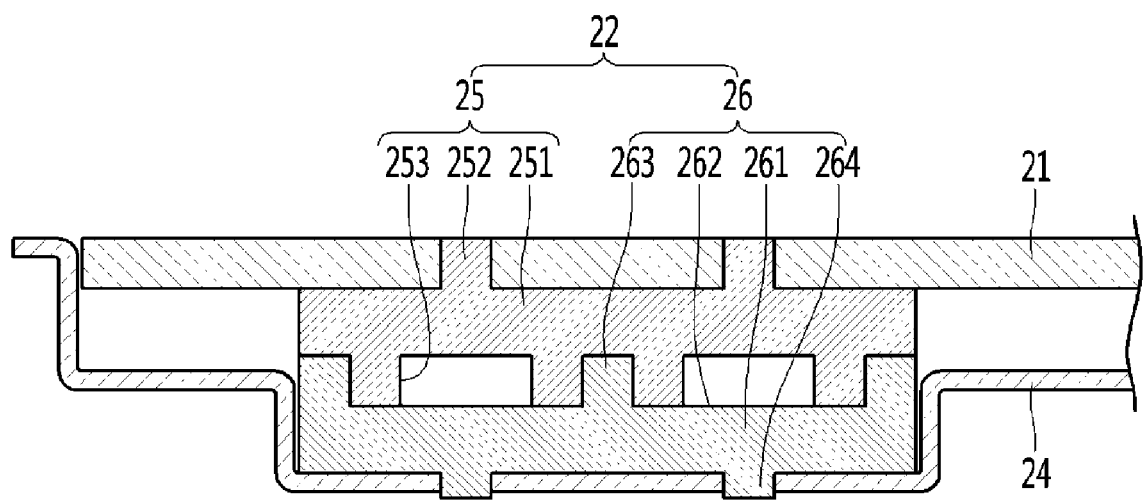
FIG. 12 is a longitudinal cross-sectional view taken along line 12-12 of FIG. 4.

FIG. 12 is a cross-sectional view taken along line 12-12 of FIG. 4. Referring to FIG. 12, the slider 22 is provided between the moving mass 21 and the support plate 24, the upper slider 25 is fixed to and mounted on the bottom surface of the moving mass 21, and the lower slider 26 is fixed to and mounted on the top surface of the support plate 24.

Also, the plurality of slider rails 253 protruding and extending from the bottom surface of the upper slider 25 are accommodated into the rail accommodation grooves 262 defined in the top surface of the lower slider 26. Also, two slider rails 253 are accommodated into each of the rail accommodation grooves 262, and the two slider rails 253 come into contact with front and rear surfaces of the rail accommodation groove 262, respectively.

Figure 13:
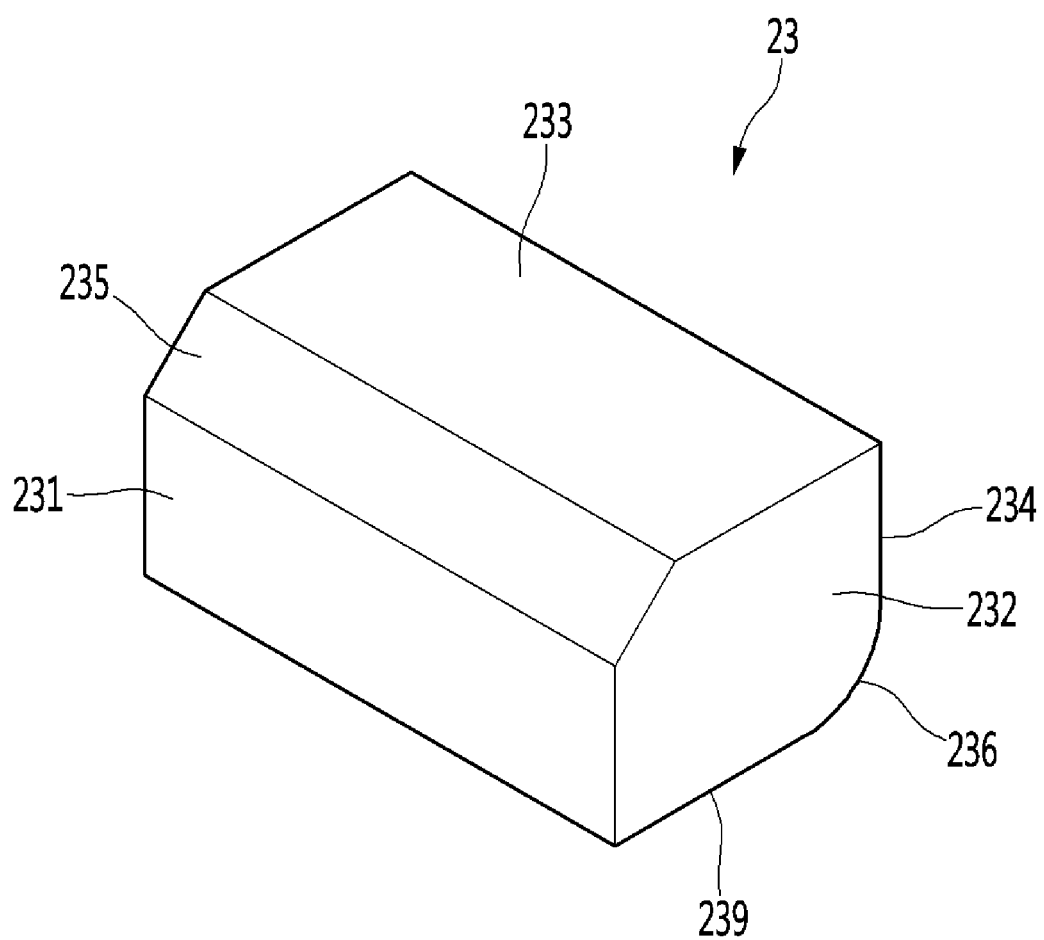
FIG. 13 is a front perspective view of an elastic damper according to an embodiment.
Figure 14:
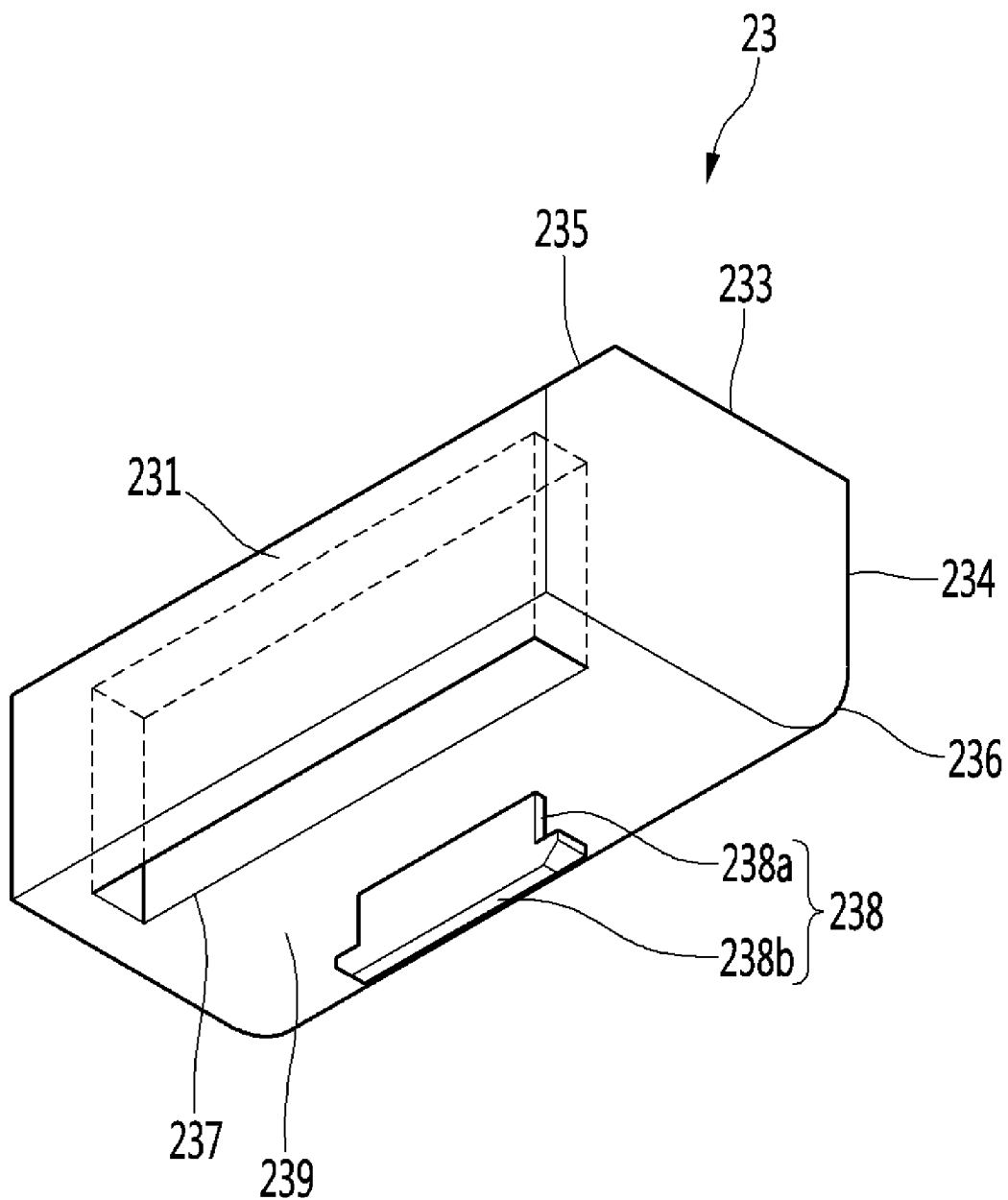
FIG. 14 is a bottom perspective view of the elastic damper.

FIG. 13 is a front perspective view of the elastic damper according to an embodiment, and FIG. 14 is a bottom perspective view of the elastic damper. Referring to FIGS. 13 and 14, the elastic damper 23 constituting the dynamic absorber 20 according to an embodiment may be provided on each of left and right edges of the moving mass 21.

In detail, when the moving mass 21 is shaken in the lateral direction, each of the left and right edges of the moving mass 21 may collide with the elastic damper 23. Here, while the elastic damper 23 is elastically deformed, the elastic damper 23 absorbs an impact transmitted to the support plate 24 by the moving mass 21. Also, the moving mass 21 may be horizontally reciprocated by the elasticity of the elastic damper 23. Also, when the drum constantly rotates at the maximum speed, the moving mass 21 oscillates in the lateral direction by the elasticity of the elastic damper 23 to absorb a portion of the continuous oscillation of the cabinet 11.

Also, although two elastic dampers 23 are provided on each of the left and right edges of the moving mass 21, an embodiment of the present disclosure is not limited thereto. For example, at least three elastic dampers 27 may be provided each of the left and right edges of the moving mass 21. For example, the elastic dampers 23 may be provided on the rear ends, central portions, and front ends of both edges of the moving mass 21, respectively.

Also, each of the elastic dampers 23 may have a hexahedral shape having a front surface 231, a rear surface 234, side surfaces 232, a top surface 233, and a bottom surface 239. Also, an inclined portion 235 may be provided at a corner at which the front surface 231 and the top surface 233 meet each other, or the corner may be rounded. Also, a rounded portion 236 or an inclined portion may also be provided at a corner at which the bottom surface 239 and the rear surface 234 meet each other. Since the inclined portion 235 is provided, when horizontal force of the moving mass 21 is applied to the front surface 231, the elastic damper 23 may be deformed in shape to protrude and thereby to be prevented from interfering with the top plate 12. Also, since the rounded portion 236 is provided, when the horizontal force of the moving mass 21 is applied to the front surface 231, a corner of the rear surface of the elastic damper 23 may protrude to be prevented from interfering with a corner of the side edge of the moving mass seating part 241.

Also, the elastic damper 23 may further include an elastic groove 237 recessed upward from the bottom surface 239 and a coupling arm 238 protruding from the bottom surface 239 and fitted into the elastic damper coupling hole 245. In detail, when the moving mass 21 presses the bottom surface of the elastic damper 23 while being shaken in the horizontal direction, the elastic groove 237 may be provided to allow the elastic damper 23 to be easily deformed to wall absorb the impact. The elastic groove 27 may be defined as an impact absorption groove. Here, the elastic groove 27 may be recessed with a predetermined width in left/right and front/rear directions and a predetermined depth upward.

The elastic groove 27 may be defined in a position closer to the front surface 231 than the rear surface 234 to facilitate the impact absorption of the moving mass 21. Also, the elastic groove 27 may have a structure in which the elastic groove 27 is opened in the top surface of the elastic damper 23 and recessed downward in addition to a structure in which the elastic groove 27 is opened in the elastic damper 23 and recessed upward. For example, the elastic groove 27 may be opened in the inclined portion 235 and recessed by a predetermined depth downward.

Also, the coupling arm 238 may include an extension end 238a extending by a predetermined length from the bottom surface 239 and a hook protrusion 238b extending from a side edge of an end of the extension end 238a. That is, the coupling arm 238 may have an inverted T shape, but is not limited thereto. A transversely cross-section of the extension end 238a may have a size corresponding to the shape of the elastic damper coupling hole 245, and the coupling arm 238 may be prevented from being separated from the elastic damper coupling hole 245 by the hook protrusion 238b.

To couple the coupling arm 238 to the elastic damper coupling hole 245, the elastic damper 23 is tilted so that one side hook protrusion 238b is inserted to pass through the elastic damper coupling hole 245. Then, the elastic damper 23 is tilled in an opposite direction so that the opposite side hook protrusion 238b is inserted to pass through the elastic damper coupling hole 245. Also, to prevent the elastic damper 23 from being shaken in the vertical direction in the state of being coupled to the support plate 24, the extension end 238a may have a length corresponding to a thickness of the support plate 24. That is, a distance between the bottom surface 239 and the upper end of the hook protrusion 238b may be equal to the thickness of the support plate 24. Also, the coupling arm 238 may be provided at a position closer to the rear surface 234 than the front surface 231 of the elastic damper 23.

Figure 15:
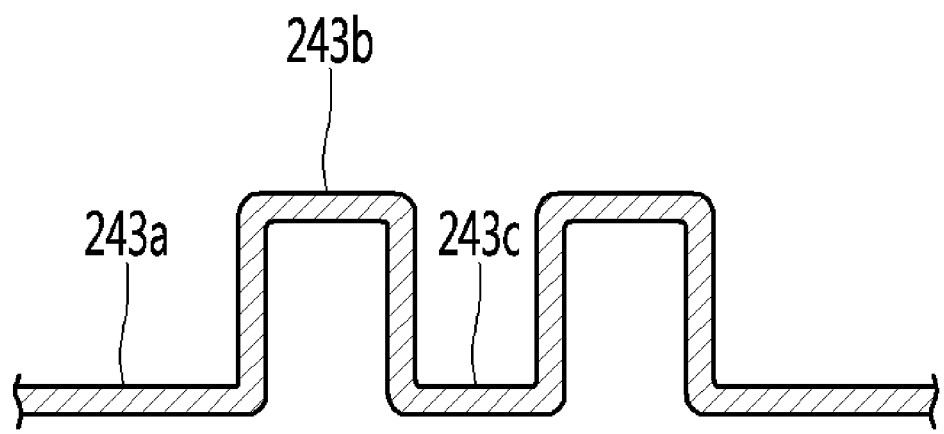
FIG. 15 is a longitudinal cross-sectional view taken along line 15-15 of FIG. 7.

FIG. 15 is a cross-sectional view taken along line 15-15 of FIG. 7. Referring to FIG. 15, a separate recess, i.e., the second recess 243c may be defined inside the protrusion 243b to increase the natural oscillation of the support plate 24. In detail, a bottom surface of the second recess 243c may be provided on the same surface as that of the first recess 243a, but is not limited thereto. That is, the bottom surface of the first recess 243a may be lower than that of the second recess 243c.

Figure 16:
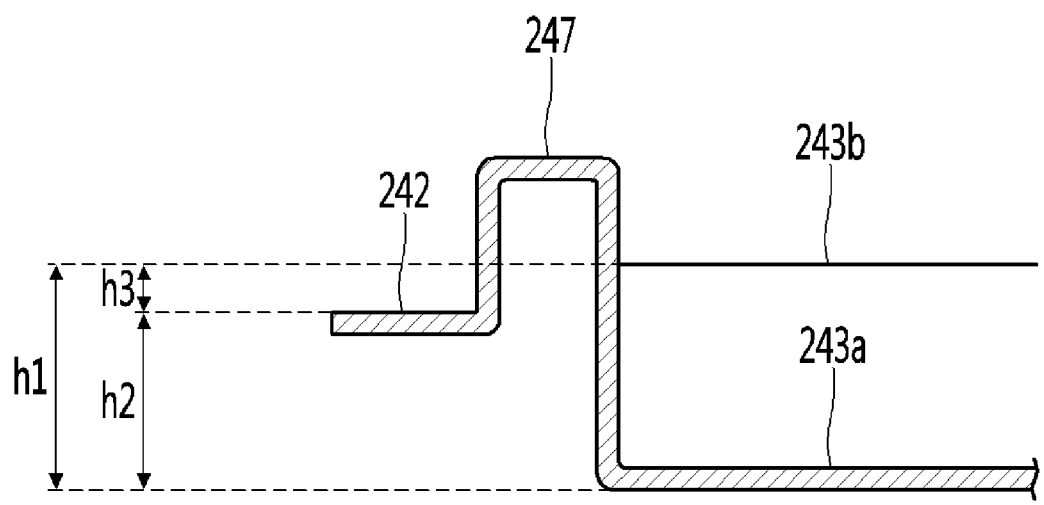
FIG. 16 is a longitudinal cross-sectional view taken along line 16-16 of FIG. 7.

FIG. 16 is a longitudinal cross-sectional view taken along line 16-16 of FIG. 7. Referring to FIG. 16, the bottom surface of the first recess 243a may be lower than the cabinet seating part 242. In detail, the first recess 243a may be recessed from the top surface of the projection 247, and also the first recess 243a may be recessed up to a position that is lower than that cabinet seating part 242. Here, a recessed depth of the first recess 243a may be limited by the structure such as the tub 16 accommodated in the cabinet 11. That is, it is necessary to prevent the bottom surface of the first recess 243a from interfering with a top surface of the tub 16.

If the bottom surface of the first recess 243a does not interfere with the structure such as the tub 16, the projection 247 may be unnecessary. That is, the moving mass seating part 241 may be recessed by a depth corresponding to the thickness of the moving mass 21 in the cabinet seating part 242. Since the recessed depth of the first recess 243a is limited, the top surface of the protrusion 243b may be higher than the cabinet seating part 242. A position of the top surface of the protrusion 243b may be determined by the thickness of the moving mass 21. That is, the top surface of the protrusion 243b may be provided at a point that is spaced a distance corresponding to the thickness of the moving mass 21 downward from the top surface of the projection 247. Thus, the top surface of the protrusion 243b may be provided above the cabinet seating part 242 or provided below the cabinet seating part 242 according to the thickness of the moving mass 21. In summary, a distance h1 between the protrusion 243b and the first recess 243a is equal to the sum of a distance h3 between the protrusion 243b and the cabinet seating part 242 and a distance h2 between the first recess 243a and the cabinet seating part 242.

Hereinafter, a method for improving the transient oscillation of the laundry treating apparatus by adequately setting the oscillation absorption region or the oscillation absorption width in which the transient oscillation generated in the cabinet is effectively absorbed by the dynamic absorber 20 will be described. Equation 1 below is a dimensionless response formula showing the behavior of the dynamic absorber with respect to the oscillation generated when the drum having the eccentric load rotates.

$$Y = \sqrt{\frac{(2\zeta r)^2 + (r^2 - \beta^2)^2}{(2\zeta r)^2(r^2 - 1 + \mu r^2)^2 + [\mu r^2 \beta^2 - (r^2 - 1)(r^2 - \beta^2)]^2}} \quad \text{(Equation 1)}$$

$$r = \frac{\omega}{\omega_p},$$

$$\mu = \frac{m_a}{m_p},$$

$$\beta = \frac{\omega_a}{\omega_p},$$

$$\zeta = \frac{c_a}{2m_a \omega_p},$$

wherein:
Y: Dimensional oscillation displacement (or amplitude) of moving mass;
r: Operating speed ratio (or operating frequency ratio);
ω: Rotational speed (or rotation frequency) of drum;
ωa: Natural oscillation (or natural frequency) of moving mass;
ωp: Natural oscillation (or natural frequency) of laundry treating apparatus;
β: Oscillation ratio (or frequency ratio);
μ: Mass ratio;
ma: Mass of moving mass;
mp: Mass of laundry treating apparatus;
ζ: Attenuation ratio; and
ca: Attenuation of moving mass A dimensionless response formula of the dynamic absorber is expressed by using a mass ratio, an oscillation ratio, and attenuation ratio as variables. Also, although the mass ratio is strictly defined as the mass ratio of the moving mass 21 to the mass of the laundry treating apparatus 10, it may be regarded as the mass ratio of the dynamic absorber 20 to the mass of the laundry treating apparatus 10.

This is done because the mass is regarded as a portion of the mass of the laundry treating apparatus 10 and has little effect on determining the total mass of the laundry treating apparatus 10 because the components of the dynamic absorber 20 except for the moving mass 21 are fixed to the laundry treating apparatus 10. Also, this is done because the upper slider mounted on the bottom surface of the moving mass 21 has a mass which is negligible with respect to the mass of the moving mass 21. Thus, it is noted that the mass ratio may be interpreted as the mass ratio of the dynamic absorber 20. Also, it is noted that the oscillation ratio and the attenuation ratio may be defined or interpreted as the oscillation ratio of the dynamic absorber 20 and the attenuation ratio of the dynamic absorber 20, like the mass ratio.

A shape of the response curve shown by the response formula is determined by the mass ratio, the oscillation ratio, the attenuation ratio, and oscillation absorption capacity of the dynamic absorber 20 is determined by these variables. That is, when the rotational speed ratio of the drum increases in a state in which the mass ratio, the oscillation ratio, and the attenuation ratio, which are variables of the response formula, a dimensionless amplitude of the dynamic absorber 20 may be calculated, and thus, the calculated dimensionless value may be regarded as an oscillation displacement of the cabinet 11.

Here, the mass ratio of the dynamic absorber 20 is a design variable for determining an oscillation absorption region, and the oscillation ratio (or the frequency ratio) and the attenuation ratio are variables for determining an oscillation displacement of secondary transient oscillation after the attenuation. In detail, when the moving mass 21 of the dynamic absorber 20 is operated at the resonant point, two transient oscillations, which are significantly less than the oscillation displacement when the transient oscillation occurs, may occur.

Also, a distance between the two secondary transient oscillations is defined as an oscillation absorption region or width, and a size of the oscillation sorption region may vary according to the mass ratio. Also, the oscillation displacements, i.e., peak points of the two secondary transient oscillations may vary by adjusting the oscillation ratio and the attenuation ratio. For reference, the two secondary transient oscillations are displayed as two peak points in which the dimensionless amplitude value increases and then decreases. A distance between the two peak points is interpreted as the oscillation absorption region and varies by adjusting the mass ratio.

The resonant frequency generated in the transient oscillation may vary according to a size, mass, product variation, and eccentricity of the laundry (load) put into the drum in the laundry treating apparatus. In such a situation, to effectively absorb the transient oscillation of the laundry treating apparatus 10 to improve the oscillation, the oscillation absorption region has to be equal to or greater than the resonant frequency region.

To understand the resonant region in which the transient oscillation is generated, it was seen that the transient oscillation is mainly generated in a region in which the drum rotates at a rotational speed of about 700 rpm to about 1050 rpm when being determined through a test of the resonant frequency region in which the transient oscillation is generated, by varying an amount of laundry, a type of laundry, a weight of laundry, and a size of a washing machine. Thus, it is seen that the resonant point of the transient oscillation has a deviation of about 350 rpm according to eccentricity of the load.

This represents that the region in which the dynamic absorber 20 is capable of absorbing the transient oscillation, i.e., the oscillation absorption region (or the oscillation absorption width) has to completely cover the oscillation generation region. Here, the oscillation absorption region of the dynamic absorber 20 may be defined as a width between a rotation frequency at which the moving mass 21 starts to move in a direction opposite to the excitation force generated when the drum rotates to be accelerated and a rotation frequency at which the oscillation is reduced by the excitation force as the rotational speed of the drum increases to allow the moving mass 21 to stop.

Also, a factor that determines the size of the transient oscillation absorption region of the dynamic absorber 20 is the mass ratio. That is, the more the mass ratio increases, the more the transient oscillation absorption region is widened, and the more the mass ratio decreases, the more the transient oscillation absorption region is narrowed. In other words, the more the mass of the moving mass 21 increases, the more the transient oscillation is absorbed in a wide region.

According to the abovementioned test, it is seen that the dynamic absorber 20 has a minimum oscillation absorption region (or oscillation absorption width) of about 300 rpm and a maximum oscillation absorption region (or oscillation absorption width) of about 400 rpm. To satisfy this condition, when the test for setting the mass ratio is performed, it is seen that the oscillation absorption region is about 300 rpm when the mass ratio is about 4%. Also, the minimum mass of the moving mass 21 may be set to about 4±0.5 kg in consideration of the product deviation and the eccentric load of the laundry treating apparatus 10.

When the oscillation absorption region is narrowed to less than 300 rpm, since a difference between the oscillation displacement of the transient oscillation occurring when the dynamic damper is not mounted and the oscillation displacement of the secondary transient oscillation occurring after the dynamic damper is mounted to absorb the transient oscillation is not large, the actual oscillation absorption effect is not large.

On the other hand, to increase the oscillation absorption region, the mass ratio may increase, but an inner space of the cabinet 11 on which the dynamic absorber 20 is mounted is limited. In detail, since the dynamic absorber 20 is mounted on the top surface of the cabinet 11 and covered by the top plate 12, there is a restriction that the dynamic absorber 20 infinitely increases in surface area and thickness. In addition, the mass of the dynamic absorber 20 increases, the total mass of the laundry treating apparatus 10 also increases together, so that the mass of the dynamic absorber 20 may not infinitely increase.

Theoretically, if the mass of the dynamic absorber 20, particularly, the mass of the moving mass 21 is equal to the total mass of the laundry treating apparatus 10 on which the dynamic absorber 20 is mounted, the transient oscillation may be perfectly absorbed. However, if the mass of the moving mass 21 excessively increases, since there is a disadvantage that the load of the laundry treating apparatus 10 is excessively large, it is difficult to move and install the moving mass 21, and a drooping phenomenon due to a self-weight of the moving mass 21 may occur. Above all, there is a limit to increase the load (or the mass) of the moving mass 21 due to the restriction of the installation space in the cabinet 11.

Thus, the oscillation absorption region is limited to about maximum 400 rpm. Here, the mass ratio of the dynamic absorber 20 is about 10%, and the maximum mass of the moving mass 21 may set to about 10±0.5 kg. Particularly, when the oscillation absorption region is about 350 rpm, the mass ratio of the dynamic absorber 20 is about 7%.

Figure 17:
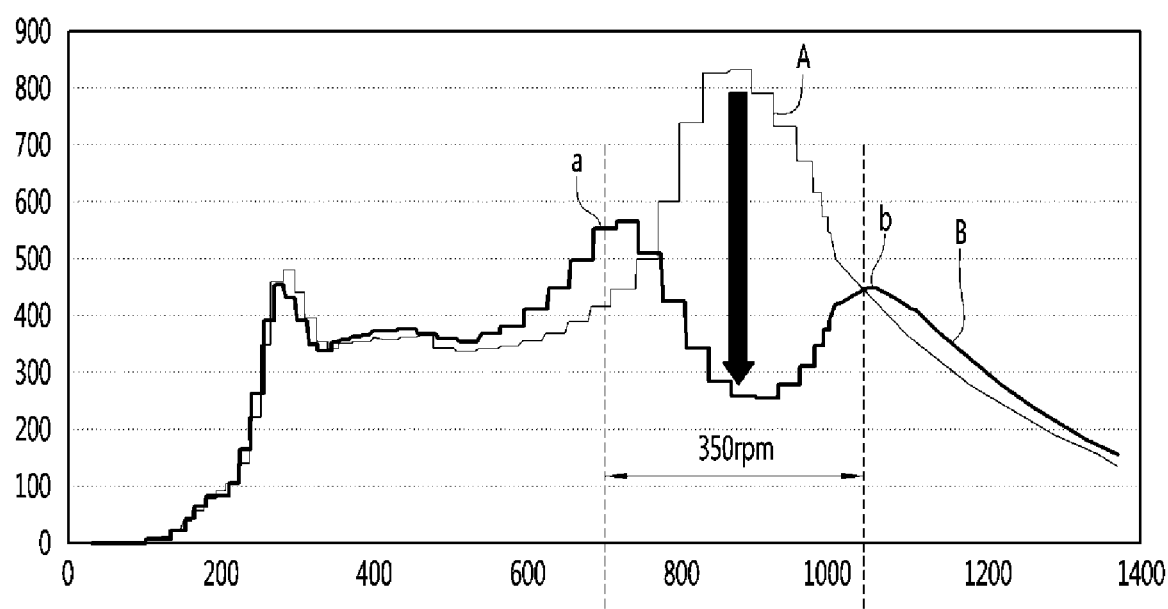
FIG. 17 is a graph illustrating an oscillation displacement of the laundry treating apparatus on which the dynamic absorber is mounted.

FIG. 17 is a graph illustrating oscillation displacement of the laundry treating apparatus on which the dynamic absorber is mounted. A horizontal axis of the graph represents the rotational speed (rpm), and a vertical axis represents the oscillation displacement of the cabinet. The rotational speed may be regarded as the same as the rotation frequency.

Referring to FIG. 17, the graph A is a graph of oscillation displacement of the cabinet measured in the laundry treating apparatus on which the dynamic absorber 20 is not mounted, and the graph B is a graph of oscillation displacement of the cabinet measured in the laundry treating apparatus on which the dynamic absorber 20 having a mass ratio of about 7% is mounted.

First, a case in which the dynamic absorber 20 is not mounted will be described. As the drum into which laundry to be rinsed or dehydrated is put starts to rotate and then increases in rotational speed, horizontal excitation force is generated by rotation of the eccentric laundry put into the drum. Also, the horizontal oscillation displacement of the cabinet increases by the excitation force. Also, when the rotational speed reaches the rotational speed of the drum, transient oscillation of the cabinet occurs by resonance. In the graph, a resonant point at which the transient oscillation occurs is determined as a range of about 900 rpm. Also, when the rotational speed of the drum exceeds the resonant frequency, the oscillation gradually decreases. Also, the cabinet experiences the continuous oscillation in which the oscillation displacement value hardly changes in a range in which the drum is maintained at the maximum speed.

In the case in which the dynamic absorber 20 is mounted, as the drum increases in rotational speed, the cabinet 11 increases in oscillation displacement. Also, in the low-speed range in which the dynamic absorber 20 does not start, the behavior of the oscillation displacement graph is not significantly different from the case in which the dynamic absorber 20 is not mounted.

However, when the rotation frequency (or rotational speed) of the drum falls within a frequency range at which the dynamic absorber 20 starts to operate, the moving mass starts to move. As a result, the increasing oscillation displacement of the cabinet rapidly decreases, and the oscillation displacement of the cabinet, which rapidly decreases as the rotational speed of the drum increases, gradually increases again. That is, it is seen that the transient oscillation generated when the dynamic absorber 20 is not mounted is absorbed by the dynamic absorber.

Then, when the oscillation displacement of the cabinet increases up to a time point at which the oscillation of the moving mass 21 is stopped, and then, the rotational speed of the drum is out of the oscillation absorption region of the dynamic absorber 20, the moving mass 21 is stopped. In detail, the rotational speed of the drum exceeds the resonant frequency, the oscillation due to the excitation force is weakened, and thus, the oscillation displacement of the cabinet decreases. Thus, when the rotational speed of the drum is out of the transient oscillation absorption region of the dynamic absorber 20, the oscillation displacement of the cabinet decreases and then is maintained to the displacement in the continuous oscillation.

Here, in the graph B, it is seen that, since the transient oscillation is absorbed by the dynamic absorber 20, two inflection points a and b having an oscillation displacement less than that in the transient oscillation are formed. The oscillation at the two inflection points may be defined as secondary transient oscillation. Also, the two inflection points a and b may correspond to two peak points appearing in the response curve.

In detail, the two secondary transient oscillation may occur at each of an initial point and the last point, respectively. The front secondary transient oscillation is oscillation occurring because the moving mass 21 absorbs the oscillation that is increasing as the moving mass 21 starts to move. Also, the rear secondary transient oscillation is oscillation occurring because the behavior of the moving mass 21 is stopped, and thus, the cabinet behaves under the same condition as the case in which the dynamic absorber is not mounted.

Also, when the oscillation absorption region is widened by adjusting the mass ratio, the oscillation displacement of the secondary transient oscillation may be more reduced, and the time point at which the front secondary transient oscillation occurs may be advanced to the low-speed range. Thus, stability of the washing machine may be improved when compared to the case in which the transient oscillation occurs at the high-speed range. Also, the oscillation displacement at the rear secondary transient oscillation may be controlled to be significantly lower than that at the front secondary transient oscillation by adjusting the oscillation ratio and the attenuation ration.

Here, the reason in which the two secondary transient oscillation occur is because the oscillation absorption amount is largest at the resonant point of the drum. That is, since the moving mass 21 is designed to absorb the transient oscillation as much as possible at the resonant point at which the transient oscillation occurs by allowing the moving mass 21 to maximally oscillate in the direction opposite to the oscillation direction generated by the excitation force, it is natural that the secondary transient oscillation occurs at both ends of the oscillation absorption region.

It is seen that when the oscillation absorption region increases in width, the oscillation absorption effect increases by significantly reducing the oscillation displacement of the secondary transient oscillation. On the other hand, it is seen that when the oscillation absorption region decreases in width, the oscillation absorption effect does not significantly increases because a difference between the oscillation displacement of the transient oscillation before the dynamic absorber is mounted and the oscillation displacement of the secondary transient oscillation is not large.

The laundry treating apparatus including the above-described constituents according to the embodiment has following effects. First, since the moving mass is provided to be slidably movable on the support plate, the moving mass may horizontally move in the phase opposite to the acting direction of the oscillation generated in the cabinet to improve the oscillation attenuation capacity. Second, since the moving mass is supported to be horizontally movable on the top surface of the base plate by the slider having the predetermined frictional force, the transient oscillation generated in the cabinet may be effectively absorbed.

Third, the mass ratio of each of the moving mass and the laundry treating apparatus on which the moving mass is mounted may be adequately adjusted to sufficiently secure the oscillation absorption region (or the oscillation absorption width) for absorbing the transient oscillation. That is, the rotation frequency region of the drum in which the transient oscillation generated in the cabinet occurs may be effectively covered to improve the oscillation reduction effect.

Fourth, since only one directional force acts on the elastic damper mounted on the side surface of the moving mass, the elastic damper may be extended in lifespan, and the oscillation absorption capacity may be improved. That is, since the normal stress acts on the elastic damper according to the embodiment, the elastic damper may be extended in lifespan, and the oscillation absorption capacity may be improved when compared to the elastic damper on which the shear stress acts according to the prior art.

The present disclosure has been proposed to improve the above-described limitations. In one embodiment, a laundry treating apparatus includes: a cabinet; a drum accommodated in the cabinet; a tub accommodating the drum; and a dynamic absorber provided to absorb oscillation of the cabinet, wherein the dynamic absorber includes: a support plate coupled to the cabinet; a moving mass provided on the support plate; and a slider interposed between the moving mass and the support plate to allow the moving mass to be reciprocated with attenuation due to frictional force on the support plate.

In another embodiment, a laundry treating apparatus includes a cabinet; a drum accommodated in the cabinet; a tub accommodating the drum; and a dynamic dampener provided to dampen oscillations of the cabinet, wherein the dynamic dampener includes: a support plate coupled to the cabinet; a mass body provided on the support plate; and a friction plate interposed between the mass body the support plate to apply a friction force to attenuate a relative motion of the mass body.

In yet another embodiment, a laundry treating apparatus comprising: a cabinet; a drum accommodated in the cabinet; a tub accommodating the drum; and a dynamic dampener provided to dampen oscillations of the cabinet, wherein the dynamic dampener includes: a support plate coupled to the cabinet; and a mass body movably provided on the support plate a friction plate interposed between the mass body and the support plate so that the mass body moves relative to the cabinet during a prescribed range of rotational speeds of the drum.

The details of one or more embodiments are set forth in the accompanying drawings and the description below. Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treating apparatus comprising:
   a cabinet;
   a drum accommodated in the cabinet;
   a tub accommodating the drum; and
   a dynamic dampener provided to dampen oscillations of the cabinet, wherein the dynamic dampener includes:
      a support plate coupled to the cabinet;
      a mass body provided on the support plate; and
      a friction plate interposed between the mass body and the support plate to apply a friction force to attenuate a relative motion of the mass body,
   wherein the support plate includes:
      a projection extending from an outer edge of the support plate to define an accommodation groove in the support plate to receive the mass body;
      a first cabinet coupling extension extending from a first side edge of the projection and coupled to the cabinet; and
      a second cabinet coupling extension extending from a second side edge of the projection and coupled to the cabinet.

2. The laundry treating apparatus according to claim 1, wherein the dynamic dampener further includes one or more elastic dampers provided on opposing side edges of the mass body.

3. The laundry treating apparatus according to claim 1, wherein a length of the mass body accommodation groove in a first direction is greater than a length of the mass body in the first direction,
   the first direction is a moving direction of the mass body, and
   an elastic damper is provided in a space defined between of the mass body and the mass body accommodation groove.

4. The laundry treating apparatus according to claim 3, wherein a plurality of forming protrusions are defined on a bottom surface of the mass body accommodation groove, and the plurality of forming protrusions extend in the first direction and are spaced apart from each other in a second direction crossing the first direction, wherein the first direction corresponds to a moving direction of the mass body.

5. The laundry treating apparatus according to claim 4, wherein a recess is further provided between adjacent pairs of the forming protrusions,
   each of the plurality of forming protrusions has a length corresponding to a width of the mass body accommodation groove in the first direction, and
   the recess has a length less than the width of the mass body accommodation groove in the first direction.

6. The laundry treating apparatus according to claim 4, wherein a height of the projection from the bottom surface of the mass body accommodation groove is greater of a height of the plurality of forming protrusions from the bottom surface of the mass body accommodation groove.

7. The laundry treating apparatus according to claim 1, wherein the projection is positioned around a periphery of the mass body.

8. The laundry treating apparatus according to claim 1, wherein:
   the support plate is provided on an upper end of the cabinet,
   the mass body moves horizontally on the support plate, and
   the first and second cabinet coupling extensions are coupled to left and right upper ends of the cabinet, respectively.

9. The laundry treating apparatus according to claim 1, wherein the friction plate includes:
a lower slider mounted on the support plate; and
an upper slider mounted on a bottom surface of the mass body and slidably movable on a top surface of the lower slider, and
wherein the friction plate includes a plastic material associated with a predetermined frictional force.

10. The laundry treating apparatus according to claim 9, wherein the upper slider includes:
an upper slider body;
a plurality of coupling protrusions protruding from a top surface of the upper slider body; and
a plurality of slider rails protruding from a bottom surface of the upper slider body, and
wherein the lower slider comprises:
a lower slider body;
a plurality of second coupling protrusions protruding from a bottom surface of the lower slider body; and
at least one rail accommodation groove recessed from a top surface of the lower slider body to accommodate the plurality of slider rails.

11. The laundry treating apparatus according to claim 10, wherein a plurality of upper slider coupling holes are defined in the mass body to receive the plurality of first coupling protrusions, and
a plurality of lower slider coupling holes are defined in the support plate to receive the plurality of second coupling protrusions.

12. The laundry treating apparatus according to claim 10, wherein the at least one rail accommodation groove includes two rail accommodation grooves divided by a partition wall, and
at least two of the slider rails are accommodated into each of the two rail accommodation grooves.

13. The laundry treating apparatus according to claim 1, wherein:
the dynamic dampener further includes an elastic damper provided on a side edge of the mass body,
a coupling arm protrudes from a bottom surface of the elastic damper, and
a coupling hole, into which the coupling arm is fitted, is defined in the support plate.

14. The laundry treating apparatus according to claim 13, wherein an elastic groove is defined inside the elastic damper,
the elastic groove is recessed downward from a top surface of the elastic damper or recessed upward from a bottom surface of the elastic damper, and
the elastic groove is defined between a surface coming into contact with the mass body and the coupling arm.

15. The laundry treating apparatus according to claim 1, wherein the mass body is a single metal plate or a plurality of metal plates that are coupled together.

16. The laundry treating apparatus according to claim 1, wherein the dynamic dampener has an oscillation absorption width in a range of 300 rpm to 400 rpm.

17. The laundry treating apparatus according to claim 1, wherein the dynamic dampener has a mass ratio of 4% to 10% with respect to the laundry treating apparatus.

18. The laundry treating apparatus according to claim 1, wherein the dynamic dampener has a mass ratio of 7% with respect to the laundry treating apparatus.

19. The laundry treating apparatus according to claim 1, wherein the mass body has a mass in a range of 3.5 kg to 10.5 kg.

20. A laundry treating apparatus comprising:
a cabinet;
a drum accommodated in the cabinet;
a tub accommodating the drum; and
a dynamic dampener provided to dampen oscillations of the cabinet, wherein the dynamic dampener includes:
a support plate coupled to the cabinet;
a mass body provided on the support plate; and
a friction plate interposed between the mass body and the support plate to apply a friction force to attenuate a relative motion of the mass body,
wherein the support plate includes a projection extending from an outer edge of the support plate to define an accommodation groove in the support plate to receive the mass body,
wherein the friction plate includes:
a lower slider mounted on the support plate; and
an upper slider mounted on a bottom surface of the mass body and slidably movable on a top surface of the lower slider,
wherein the friction plate includes a plastic material associated with a predetermined frictional force,
wherein the upper slider includes:
an upper slider body;
a plurality of coupling protrusions protruding from a top surface of the upper slider body; and
a plurality of slider rails protruding from a bottom surface of the upper slider body, and
wherein the lower slider comprises:
a lower slider body;
a plurality of second coupling protrusions protruding from a bottom surface of the lower slider body; and
at least one rail accommodation groove recessed from a top surface of the lower slider body to accommodate the plurality of slider rails.

* * * * *